R. D. O. SMITH.

Urinal.

No. 9,427. Reissued Oct. 19, 1880.

*ATTEST:*

Aug. Jordan

R. R. Barnes.

*INVENTOR:*

R. D. O. Smith

N. PETERS, PHOTO-LITHOGRAPHER, WASHINGTON, D. C.

UNITED STATES PATENT OFFICE.

ROBERT D. O. SMITH, OF WASHINGTON, DISTRICT OF COLUMBIA.

URINAL.

SPECIFICATION forming part of Reissued Letters Patent No. 9,427, dated October 19, 1880.

Original No. 136,105, dated February 18, 1873. Application for reissue filed September 14, 1880.

DIVISION C.

*To all whom it may concern:*

Be it known that I, ROBERT D. O. SMITH, of Washington, in the District of Columbia, have invented a new and useful Improvement in Urinals; and I do hereby declare that the following is a full and complete description of the same.

Heretofore apartments have been ventilated by means of shafts or flues connected therewith, through which an upward flow of air has been produced by heat, fans, or other artificial means when the required current would not be produced by natural causes; and I am aware that the ventilation of sewers has been attempted in a similar way.

I am also aware that a urinal has been provided with a pipe at its upper part and a flange or hood extending laterally therefrom above the bowl of the urinal, and with another pipe extending up the back of the urinal, but open at both upper and lower ends, for the alleged purpose of ventilating said urinal, said first-named pipe being connected with a ventilating flue or duct. The well-known law by which fluids in motion flow along the shortest lines, or lines of least resistance, makes it evident that the air withdrawn from the urinal by said ventilating-pipe will be exhausted from the immediate vicinity of the hood or flange at the top of the urinal, instead of from the bottom, in the immediate vicinity of the escape-pipe, from which foul odors do and will escape.

The object of my invention is to cause a current of pure air to pass in front of, over, or through the orifice by which the urine or other fluid matters escape from the urinal into the waste-pipe, so that any and all foul odors or gases arising out of said waste-pipe will be deflected and carried into the ventilating-pipe, instead of escaping by lateral diffusion into the apartment; and it therefore consists in a urinal provided with an outlet for urine and a ventilating-pipe arranged with respect to said fluid-outlet, so as to cause a current of air to flow in close proximity, in front of, over, or through said fluid-outlet, and thereby cause all gases escaping therefrom to be deflected into said ventilating-pipe, to be carried away by the ventilating current.

That others may fully understand my invention, I will particularly describe it, having reference to the accompanying drawings, wherein—

Figure 1:
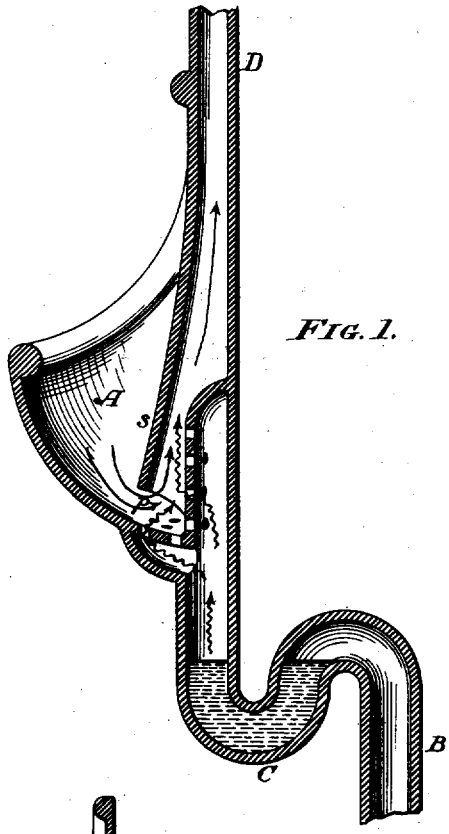
Figure 2:
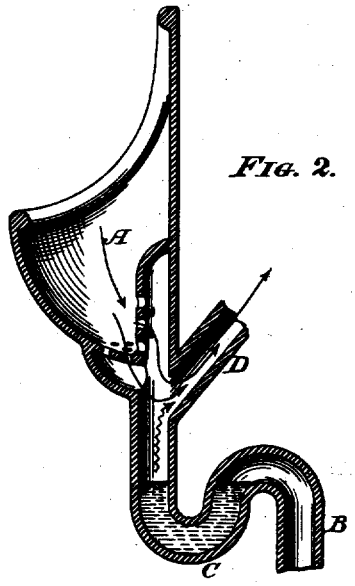

Figure 1 is a vertical longitudinal section of my urinal. Fig. 2 shows a modification of the same.

Plain arrows indicate pure air; crooked arrows, impure air.

A is the bowl of the urinal, and B is the waste-pipe whereby the urine, &c., is conveyed away. C is an ordinary stench-trap.

D is a ventilating-outlet adapted to be connected with a suitable ventilating flue or duct, whereby a current of air may be caused to flow through said bowl A to ventilate the same.

The characteristic odor of urine in the vicinity of a urinal is largely due to the ammonia set free in its decomposition, which is highly volatile, and therefore possesses great power of diffusion. If, therefore, these odors are permitted to escape from the vicinity of the waste-pipe, it is impossible to regather them. By means of my invention they are captured immediately, and are not permitted to escape into the apartment. To accomplish this purpose I prefer to extend the ventilating-pipe, as at *s*, down and over the outlet into the waste-pipe B, leaving an opening, *p*, at the bottom of said ventilating-pipe for the common passage in the same direction of the fluids for escape into the waste-pipe and air for the ventilating-pipe. The ventilating-pipe will cause this inward flow of air to be constant, and it will pass in close proximity in front of or over the orifice of the waste-pipe, so that the gaseous emanations arising from said waste-pipe cannot escape toward the bowl A and to the apartment without doing so in opposition to said inflowing air-current.

In Fig. 2 a modified structure is shown, which may be preferable in some places, but which does not introduce any new principle of operation nor any modification in the mode of action. In this case the ventilating-outlet is placed below instead of above the waste-outlet, so that the ventilating current of air passes through said outlet and with the escaping fluids for a short distance.

It is intended to reserve from this patent all matters covered or which might be covered by reissue of the original patent of which this is a division except that which relates specifically to urinals.

Having described my invention, what I claim as new is—

1. A urinal provided with a waste-pipe orifice adapted to be connected to a waste-pipe, combined with a ventilating-outlet adapted to be connected with a ventilating pipe or flue, and so located that the inflowing ventilating current of air will pass in close proximity to the waste-outlet, and thereby deflect and carry into the ventilating-pipe all gaseous emanations from the waste-pipe, as set forth.

2. A urinal provided with a bowl, A, and an outlet at its bottom for the escape of urine, &c., combined with a ventilating-pipe, D, extending continuously, as at *s*, down near to the bottom of the bowl, so as to leave an opening, *p*, common to the air and fluids passing to their respective outlets, as set forth.

3. In ventilating urinals, the mode or method of rendering the same inodorous, which consists in causing a current of pure air to pass in close proximity to the waste-outlet, and then into a ventilating or exhaust outlet, substantially as herein described.

R. D. O. SMITH.

Witnesses:
M. V. SMITH,
L. H. MARSHALL.